United States Patent [19]
Chu

[11] Patent Number: 6,052,942
[45] Date of Patent: Apr. 25, 2000

[54] POTTED PLANT FEEDING APPARATUS

[76] Inventor: Gilbert Chu, 7Fl.,No. 19, Alley 1, Lane 269,Wu Shing St., Taipei, Taiwan

[21] Appl. No.: 09/252,649

[22] Filed: Feb. 19, 1999

[51] Int. Cl.⁷ ..................................................... A01G 29/00
[52] U.S. Cl. .............................................................. 47/48.5
[58] Field of Search ............................... 47/79, 48.5, 40.5

[56] References Cited

U.S. PATENT DOCUMENTS

| 4,970,823 | 11/1990 | Chen et al. | 47/48.5 |
| 5,113,888 | 5/1992 | Beggs | 47/48.5 |
| 5,172,515 | 12/1992 | Lapshansky, Sr. et al. | 47/48.5 |
| 5,761,846 | 6/1998 | Marz | 47/48.5 |
| 5,896,700 | 4/1999 | McGough | 47/48.5 |

*Primary Examiner*—Thomas Price

[57] ABSTRACT

Disclosed herein is a plant feeding apparatus comprising a water container, an air flow tube, an seeping element and a hose: the bottom of the water container is extended to form a mouth from where sufficient amount of water, or water mixed with fertilizer or medicines is infused; the seeping element included an adapter and a wedge both assembled to the mouth of the container; there are two connectors extending upwardly and downwardly respectively from the bottom of the adapter; an air flow tube is inserted into the upward connector, whereas a hose is inserted into the downward connector; an adjusting valve is installed at a proper portion on the hose; there are provided for the wedge a water inlet and a water outlet communicable with each other; by inserting the wedge into soil in the pot and adjusting the adjusting valve to control the required amount of air into the water container, corresponding proper amount of nutritious water is supplied to the pot soil from the container by gravity to nourish the plants.

2 Claims, 5 Drawing Sheets

6,052,942

POTTED PLANT FEEDING APPARATUS

BACKGROUND OF THE INVENTION (1) Field of the Invention

This present invention relates to a potted plate feeding apparatus, and more particularly, to potted plate feeding apparatus which is able to control amount of feeding water mixed with necessary fertilizers for plants so as to maintain proper wetness in the pot soil and ensure plant thriving.

(2) Description of the Prior Art

Potted plants and flower are commonly welcome to residents in a highly populated city for environmental beautification and every day life relaxation . In order to assure that the potted plants thrive well, a thoughtful care, for example regular sprinkling, must not be neglected. However, such a simple regular care is apt to be forgotten, or neglected in case the whole family are absent from home on vacation. Lack of regular sprinkling will result in affecting plants vitality or even causing them to wither.

In order to solve the problems described above, there is an automatic potted plant water supply apparatus popularly in use. As shown in FIG. 1, this apparatus 10 is comprised of a seeping element 11, a miniature pump 12, connecting tube 13, and a water container 14. There is a water passage 17 provided in the seeping element 11. A portion at the bottom end of the seeping element 11 is buried in soil 16 in a plant pot 15, whereas the top end of the seeping element 11 is connected to the miniature pump 12. One end of the connecting tube 13 is connected to the miniature pump 12; while the other end of the connecting tube is extended to the bottom of the water container 14 which being full of water. Here, water supply function is carried out by pressing the miniature pump 12 to let the water flow continuously from the container 14 into soil 16 in the pot 15 via connecting tube 13 by means of capillary attraction of the seeping element 11. However, such a conventional automatic potted plant sprinkling apparatus has following shortcomings:

1. Due to random water flow, water will be continuously supplied to potted plant via connecting tube from the seeping element without resting, and as a result, will make the plants submerge in water and cause putrefaction of plant roots.

2. At the beginning, if it is forgotten to press the miniature pump for operation, the potted plats have no way to be nourished by water and may wither to death.

In order to innovate the drawbacks of conventional potted plant water supply apparatus, persistent researches and experiments have been made by the applicant for patent of the present invention for a long time and finally has succeeded in developing a potted plant feeding apparatus of the present invention which is now to be disclosed herein after.

SUMMARY OF THE INVENTION

It is an object of the present invention to provide a potted plant feeding apparatus which can feed potted plants continuously for 1 to 2 weeks of pre-determined time duration with water, or water mixed with fertilizers so that tedious every day sprinkling work can be saved, and withering of plants for want of water during the days when the whole family are absent from home can be prevented.

To achieve the object, the present invention provides a potted plant feeding apparatus comprising a water container, an air flow tube, a seeping element and a hose. The bottom of the water container is extended to form a mouth from where sufficient amount of water, or water mixed with fertilizers or medicines is infused. The seeping element includes an adapter and a wedge both assembled to the mouth of the container. There are two connectors extending upwardly and downwardly respectively from the bottom of the adapter. Ar air flow tube is inserted into the upwardly connector, whereas a hose is inserted into the downward connector. An adjusting valve is installed at a proper portion on the hose.

There are provided for the wedge a water inlet and a water outlet communicable with each other. By inserting the wedge into the sole in the pot and adjusting the adjusting valve to control the required amount of air into the water container, corresponding proper amount of nutritious water can be supplied to the pot soil from the container by gravity to nourish the plants.

BRIEF DESCRIPTION OF THE DRAWINGS

For fuller understanding of the nature and objects of the invention, references should be made to the following detailed description taken in conjunction with the accompanying drawings in which.

DETAILED DESCRIPTION OF THE PREFERRED EMBODIMENT

Figure 1:
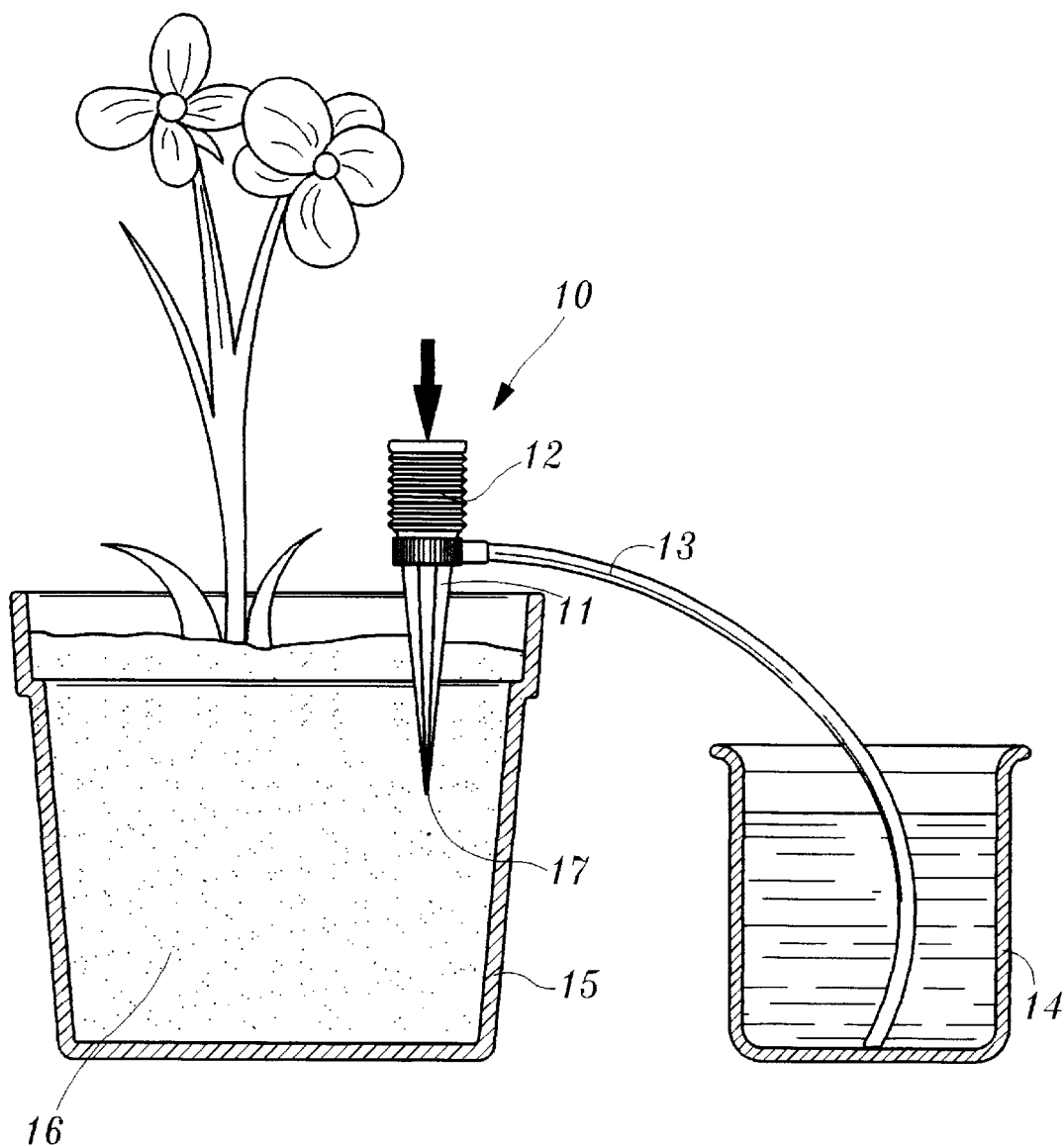
FIG. 1 is a drawing of a conventional potted plant water supply apparatus in operation.
Figure 2:
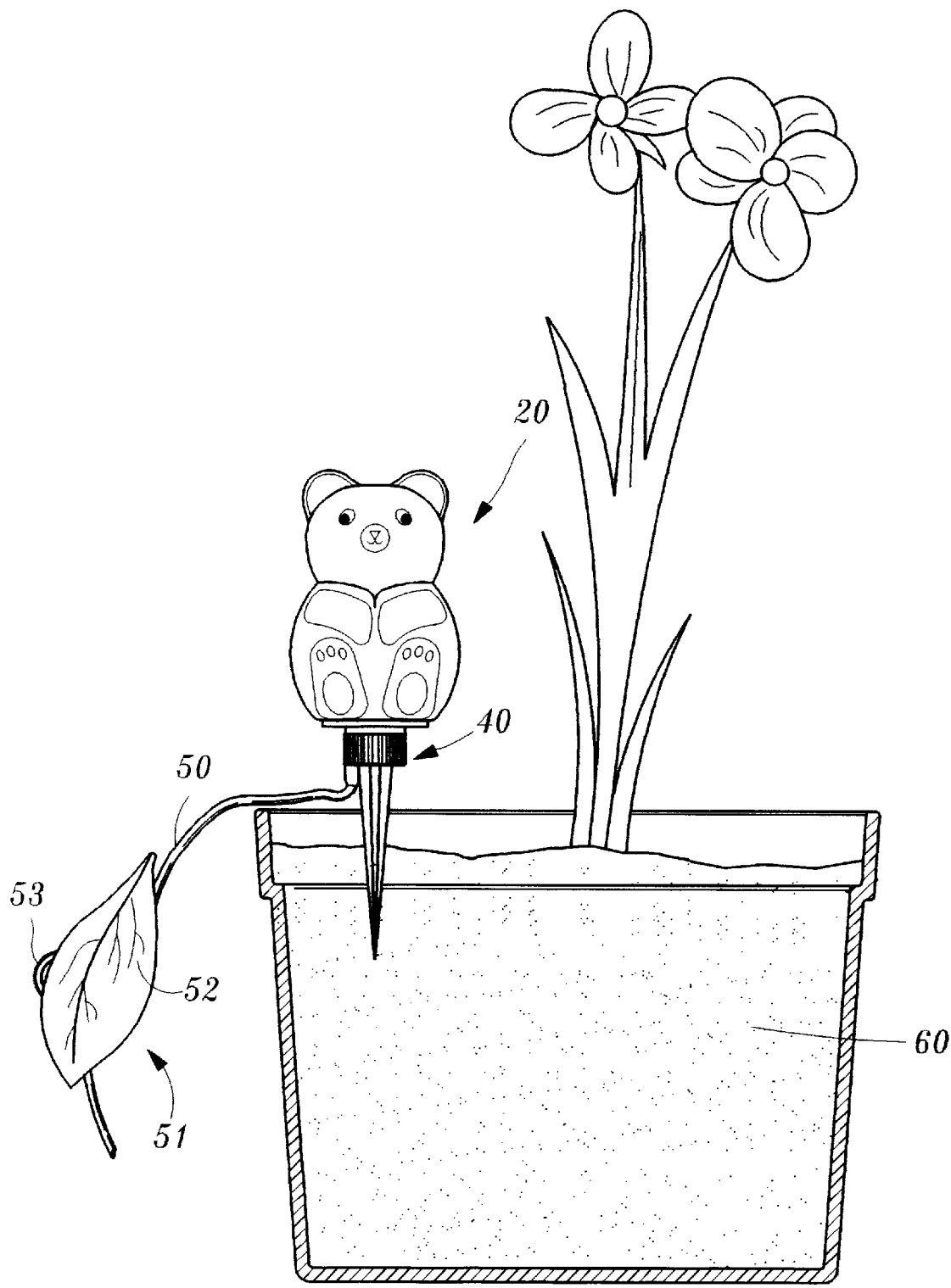
FIG. 2 is a drawing of the potted plant feeding apparatus according to the present invention in operation.
Figure 3:
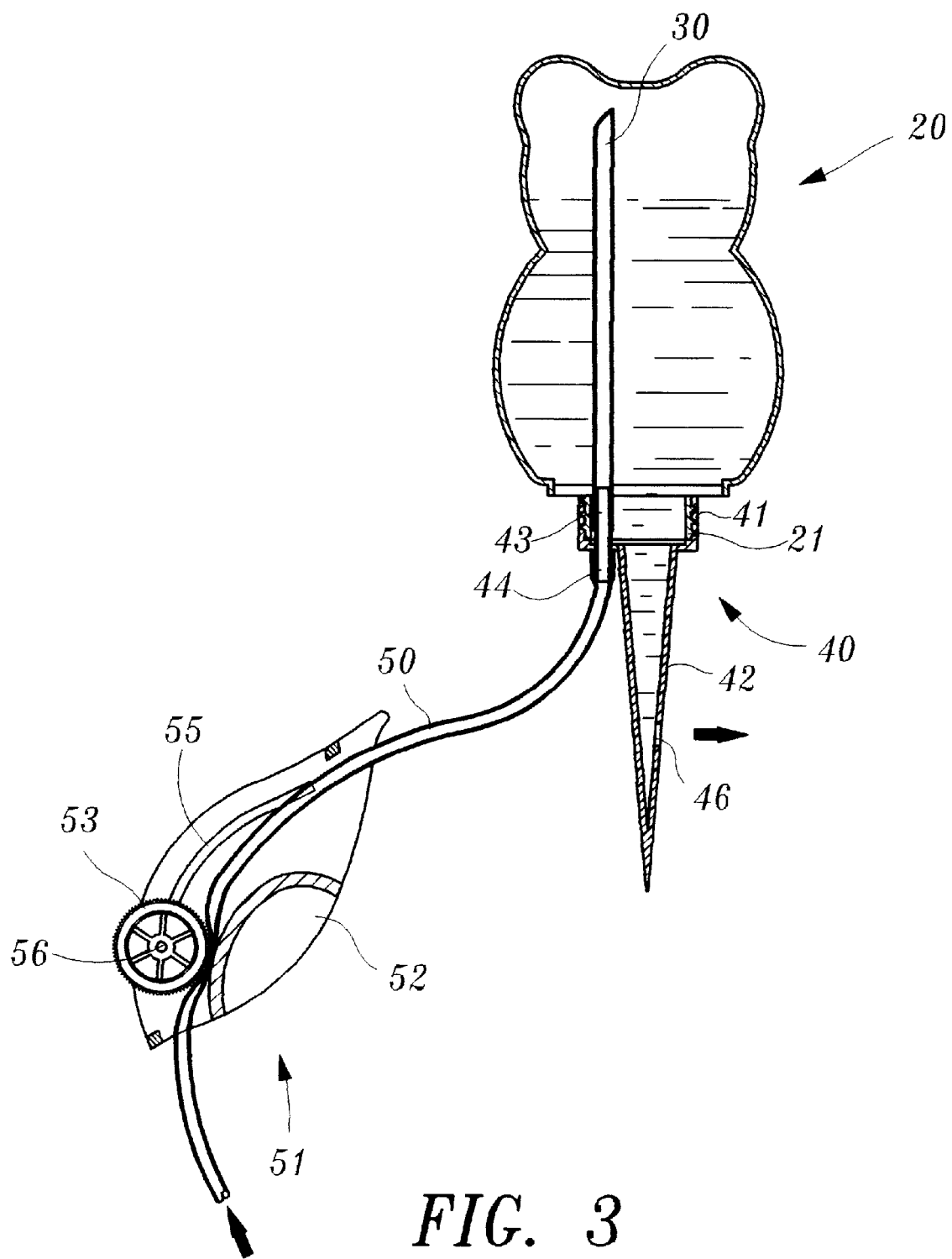
FIG. 3 is a cross sectional drawing of the potted plant feeding apparatus according to the present invention.
Figure 4:
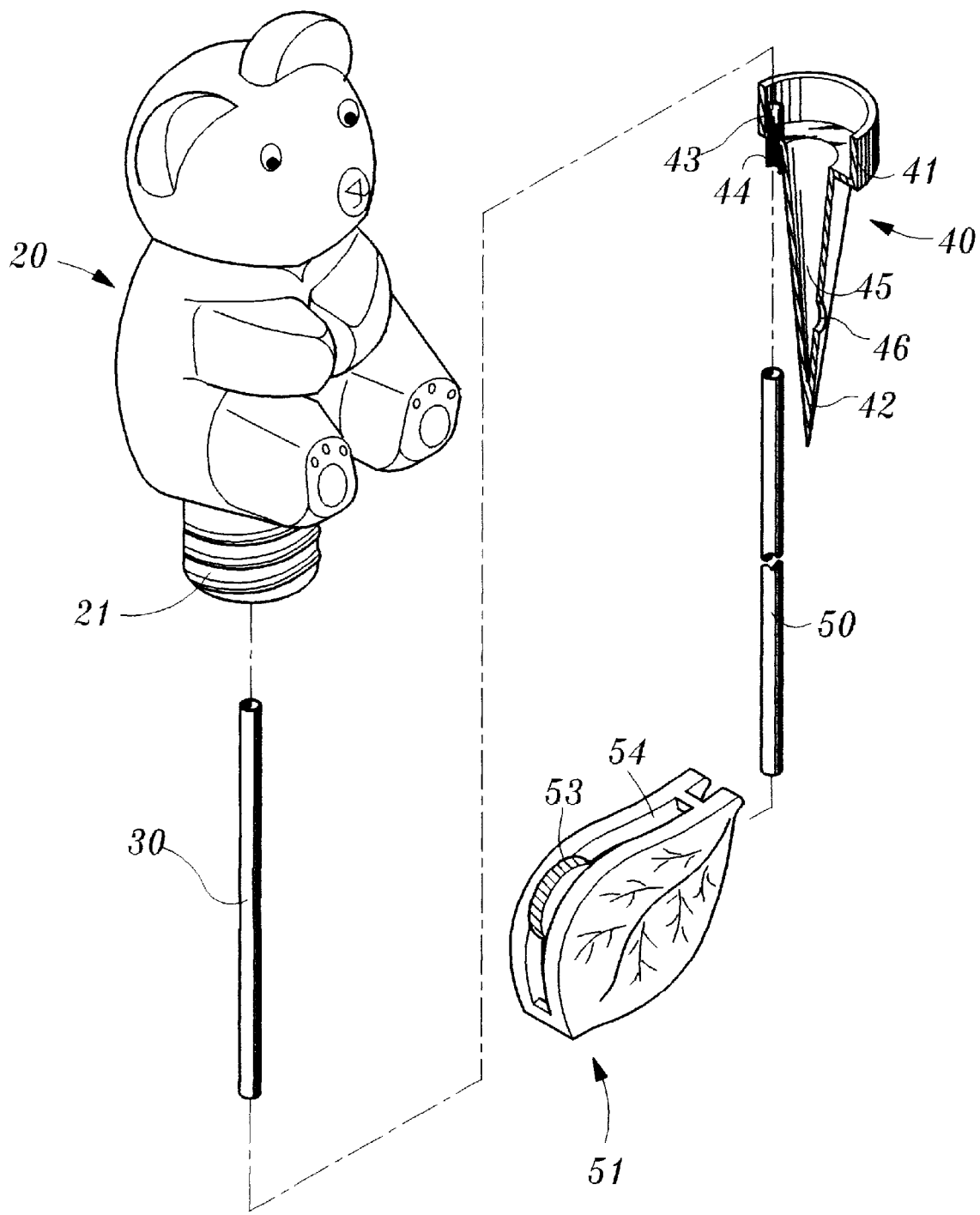
FIG. 4 is a three dimensional exploded drawing of the potted plant feeding apparatus according to the present invention.
Figure 5:
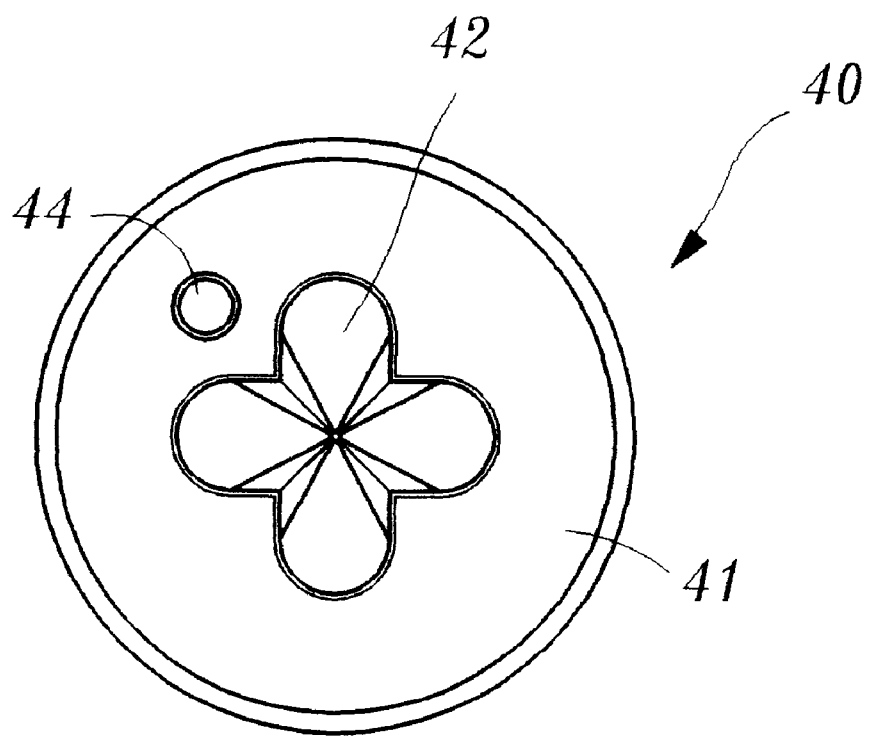
FIG. 5 is the drawing of the seeping element used for the potted plant feeding apparatus according to the present invention viewed upwardly from the bottom thereof.

Referring to FIG. 2 through to FIG. 5, the potted plant feeding apparatus of the present invention comprises a water container 20; an air flow tube 30; a seeping element 40; and a hose 50.

The figure of the water container 20 can be formed into the shapes of various animals or plants, or other equivalents, and further can print on the outer surface thereof with various decorative patterns and the information as to plant name, date of planting etc. thereon so as to enhance esthetic sense and serve for identification. The bottom of the water container 20 is extended to form a mouth 21 from where sufficient amount of water mixed with fertilizers or medicines is infused. There are male threads provided around the outer surface of the mouth 21.

The seeping element 40 included an adapter 41 and a downwardly extended wedge 42. There are female threads provided around the inner wall surface of the adapter 41 thereby screw combining the adapter 41 with the mouth 21. There are two connectors, an upward connector 43 and a downward connector 44 extending upwardly and downwardly respectively from the bottom of the adapter 41 and positioned at the same side of the wedge 42. An air tube 30 is inserted and fixed to the upward connector 43. When the seeping element 40 is attached to mouth 21 of the container 20, the front end of the air flow tube 30 extends out of the water container 20, the front end of the air flow tube 30 extends out of the surface in the container 20 to a proper height so as to discharge air in the air flow tube 30 into the water container 20.

A hose 50 is inserted into the downward connector 44. An adjusting valve 51 is installed at the proper portion on the hose 50. The adjusting valve includes a base 52 and an adjusting wheel 53. The base 52 has an opening 54, and a pair of tilted guide rails 55 are provided along both inner side wall surface of the opening 54 so as to guide a lug 56 of the adjusting wheel 53 to slide along the longitudinal direction of the base 52. Since the guide rail 55 have a tilted angle, the gripping force of the adjusting wheel 53 applicable to the hose 50 will change continuously from position to position when the adjusting wheel slides along the guide rails 55 thereby adjusting the cross sectional area of the hose 50, which in turn, varying the amount of air in the hose 50, and consequently adjusting the capillary output of water from the seeping element 40 supplied to the potted plants by gravity in accordance with their actual requirements.

As shown in FIG. 5, the appearance of the wedge 42 is formed like petals of a flower. There are provided for the wedge 42 a water inlet 45 therein and a water outlet 46 at the lower end of the wedge 42 communicable with the water inlet 45 so that water may be instilled to the soil 60 from inlet 45 through outlet 46.

When the potted plant feeding apparatus of the present invention is to be put into practice, at first, inserting the wedge 42 into the soil 60, and then actuating the adjusting valve 51 by an operator's finger thereby controlling the amount of air to flow into the hose 50 so that by gravity, the proper mixed water output to the potted plants from seeping element 40 in accordance with the plants' actual requirement is determined and performed which lasts restlessly for 1 to 2 weeks of pre-determined time duration.

The potted plant feeding apparatus of the present invention can surely offer the owner of potted plants a convenience to save tedious every day sprinkling work, and also serve to prevent the plants from withering if the owner and his/her family are to leave home for a short duration of time.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A potted plant feeding apparatus comprising:
    a water container with a mouth extending downwards from its bottom, from said mouth sufficient amount of water, or water mixed with fertilizers or medicines is infused into said container; and
    a seeping element including an adapter and a wedge both assembled to said mouth of said water container with two connectors extending upwardly and downwardly respectively from the bottom of said adapter and positioning at the same side of said wedge respectively, an air low tube being inserted and fixed to said upward connector, while a hose being inserted into said downward connector, an adjusting valve being installed at a proper portion on said hose, a water inlet and a water outlet communicable with each other being provided for said wedge.

2. The potted feeding apparatus as claimed in claim 1, wherein the figure of said water container is formed into the shapes of various animals or plants or other equivalents, and further can be printed on the outer surface thereof with various decorative patterns and the information as to plant name date of planting etc. thereon so as to enhance esthetic sense and serve for identification.

* * * * *